US006325577B1

(12) United States Patent
Anderson

(10) Patent No.: US 6,325,577 B1
(45) Date of Patent: Dec. 4, 2001

(54) MAGNETIZER/DEMAGNETIZER AND TOOL HOOK ATTACHABLE TOOL BIT HOLDER

(76) Inventor: Wayne Anderson, 65 Grove St., Northport, NY (US) 11768

( * ) Notice: Subject to any disclaimer, the term of this patent is extended or adjusted under 35 U.S.C. 154(b) by 0 days.

(21) Appl. No.: 09/501,818

(22) Filed: Feb. 10, 2000

Related U.S. Application Data

(63) Continuation-in-part of application No. 09/181,445, filed on Oct. 28, 1998, now Pat. No. 6,033,163, and a continuation-in-part of application No. 09/489,484.

(51) Int. Cl.[7] ...................................................... B23B 45/00

(52) U.S. Cl. ..................... 408/241 R; 206/350; 224/268; 224/683; 224/904; 335/284

(58) Field of Search ........................ 408/241 R; 224/268, 224/904, 683, 901, 183; 206/350, 377, 378; 335/284, 302, 303, 304, 305, 306; 81/451

(56) References Cited

U.S. PATENT DOCUMENTS

| | | | | |
|---|---|---|---|---|
| 3,662,303 | * | 5/1972 | Arllof | 335/284 |
| 5,743,451 | * | 4/1998 | Kahn | 224/268 |
| 6,033,163 | * | 3/2000 | Anderson | 408/241 R |
| 6,062,449 | * | 5/2000 | Kahn | 224/268 |
| 6,181,229 | * | 1/2001 | Anderson | 335/306 |

* cited by examiner

*Primary Examiner*—Daniel W. Howell
(74) *Attorney, Agent, or Firm*—Lackenbach Siegel

(57) ABSTRACT

A tool bit holder holds a plurality of tool bits and is clipped to the belt of the user and in one embodiment is provided with a magnetizer/demagnetizer for magnetizing the tool bits and for holding and magnetizing fasteners such as screws, and in a second embodiment the holder is formed with a flange for attaching a power tool hook or tote, whereby the user has ready excess to the power tool, tool bits, screws and magnetizer at the work site.

25 Claims, 4 Drawing Sheets

MAGNETIZER/DEMAGNETIZER AND TOOL HOOK ATTACHABLE TOOL BIT HOLDER

This application is a CIP of Ser. No. 09/181,445, Oct. 28, 1998, U.S. Pat. No. 6,033,163 and a CIP of Ser. No. 09/489,484, Jan. 21, 2000.

FIELD OF THE INVENTION

This invention relates to a tool bit holder. Specifically, this invention relates to a tool bit holder in combination with complimentary features to provide improved tool bit and drive tool functions.

BACKGROUND OF THE INVENTION

It is frequently desirable to magnetize the tips of screwdriver bits and like tool bits to form at least a temporary magnetic pole on magnetizable elements. This is particularly so with precision screwdrivers which tend to be relatively small and are used to drive relatively small head screws and like fasteners. It is advantageous to at least temporarily magnetize the tips of the driver bits or tool bits to maintain the screwdriver blade or tip within the slot of a screw head or within the cross slots formed within the head of the screw adapted to receive the Phillips screwdriver tip. By magnetizing the tip of the driver bit, and mating screw head, the screw remains attached to the bit tip without the need for the hand tool user to physically hold them together. This allows the screw to be guided through a relatively small bore or channel and moved within a confined space. Sometimes the magnetized tip of the drive bit is used to retrieve a metal item, such as a screw, washer, nail or the like, from an inaccessible place which would otherwise be difficult to reach with anything but a relatively thin shank of a drive bit. Of course, such attachment of a fastener element to the drive bit tip also frees the user's hand for holding or positioning the work into which the fastener is to be driven. In some instances, rather than magnetizing the tip of the drive member bit, the fastener itself is magnetized so that, again, it is attracted to and remains magnetically attached to the driver bit tip in the same way as if the latter had been magnetized.

Conversely, there are instances in which a magnetized driver bit tip is disadvantageous, because it undesirably attracts and attaches to itself various magnetizable elements or components. Under such circumstances, it may be desirable to demagnetize a drive bit tip that had been originally magnetized in order to render same magnetically neutral.

In addition, a tool user requires ready access to a hand tool, such as a drive tool or drill, and to a chuck, as well as to the tool bits and screws. This ready access need is particularly acute where the user is working in a limited access area, and particularly so where the hand tool, tool bits, screws and chuck were separately diversely stored and not immediately accessible. Heretofore tool bits and screws were generally boxed, and it was often inconvenient if not impractical to keep or mount the box immediately adjacent to the work space and the drill. That is, the user would have to leave the work space to find the drill, tool bits and the screws, and then return to the work space. The worker would often have to repeatedly leave the work space when particularly tool bits had to be replaced. Another prior art approach was to keep the tool bits and screws in the pockets of the user, but this had the disadvantage in that the user was not always mindful of which tool bits and screws were in which pocket. The user in retrieving a tool bit from a pocket would not be aware that the wrong tool bit was inadvertently removed until viewing the tool bit after removal.

The art desired a tool bit holder which permitted ready access to the hand tool, the chuck, the tool bits and screws, without the user repeatedly leaving the immediate work space, and further provided positive identification of the tool bits to be selected, all with minimum use of the user's hands. The art also desired work space magnetization and demagnetization of tool bits and fastener elements, with work space stowing of screws and like fastener elements, for reasons previously discussed. The present invention provides a solution to these diverse needs.

SUMMARY OF THE INVENTION

The tool bit holder includes tool bits which are mounted within the holder cover to permit the user using one hand to remove the cover and gain direct access to the array of tool bits. On viewing the array, the user removes the desired tool bit and replaces the holder cover in a positive locking manner again using one hand. The tool bit holder body is formed with a spring clip for releasably attaching the tool bit holder to the belt of the user.

In one aspect of the present invention, the tool bit holder is formed with an integral depending flange for mounting a tool tote or hook which is mounted to and depends from the holder flange so that the hand tool is hooked or cradled on the tote for ready access. A hand tool or drill is cradled on the hook which depends downwardly from the tool bit holder flange. The user, with the holder attached to his belt, with one hand rotatably unlocks and removes the cover and inspects the array of tool bits and chuck releasably mounted on the inside of the cover. The user removes the chuck and assembles it to the drill and then removes selected tool bits for assembly to the drill. The user with one hand replaces the cover on the body with a positive rotational locking action.

The present invention, in one other aspect, provides a high energy magnetizer/demagnetizer in combination with the tool bit holder cover for magnetizing/demagnetizing the tool bits, and which also includes a specific area or position for magnetically holding a magnetizable fastening element such as a screw for ready attachment to the hand tool with the tool bit in place. The high energy magnetizer/demagnetizer is an elongated permanent high energy bar magnet or alternatively a high energy magnet with a magnetically held elongated ferrometallic shunt. The magnetizer/demagnetizer is provided in a plastic housing with an adhesive for attachment to the outside of the cover or alternatively may be integrally molded as part of the cover.

The present invention, in a further aspect, is the combination of the tool bit holder with a power tool tote flange in combination with the magnetizer/demagnetizer unit. This combination provides ready work site access to screws and tool bits, ready work site magnetization and demagnetization of same, and ready use with the power tool.

The holder cover and body, in a preferred aspect of the invention, are rotatably slidably interengaging cylindrical members, with the body cylindrical side formed with three-equally spaced radially disposed holes, and with the cover cylindrical inside surface formed with three-equally spaced partially spherical buttons adjacent L-shaped grooves or slots providing flexible tabs for flexure of the cover buttons for slidably engaging and disengaging the body holes. The user thereby locks and unlocks the cover from the body using one hand in a respective directional and counter-directional rotation of less than 120°.

DESCRIPTION OF THE INVENTION

The tool bit holder construction as shown and described in application Ser. No. 09/181,445, filed Oct. 28, 1998, now Pat. No. 6,033,163 is incorporated herein by reference therefore.

Figure 2:
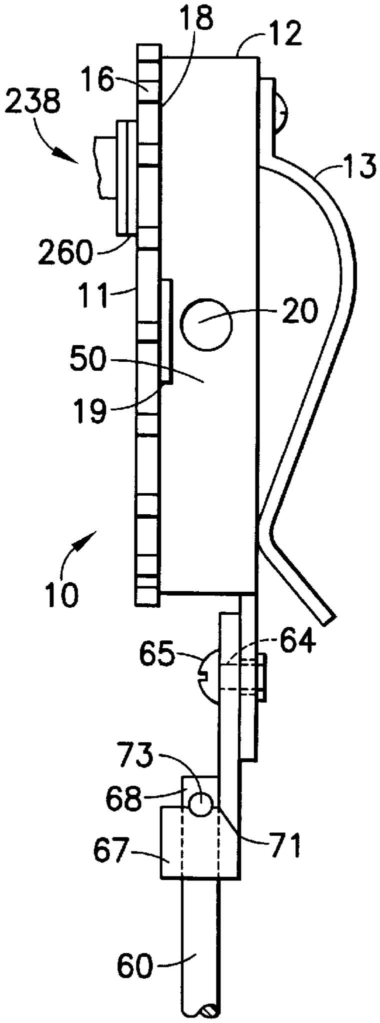
FIG. 2 is a slide elevational partial fragmentary view of the tool bit holder of FIG. 1.
Figure 3:
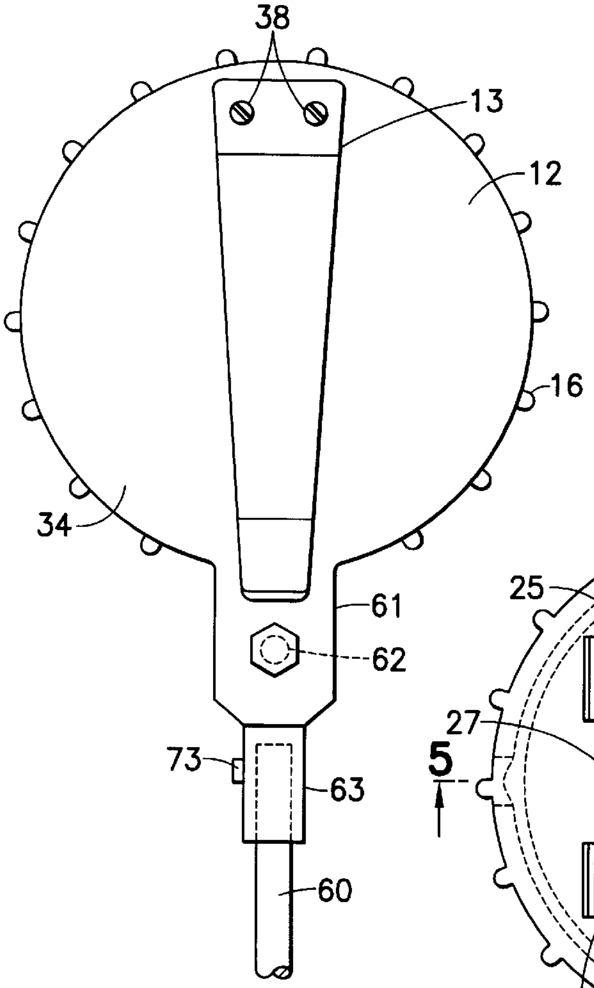
FIG. 3 is a partial back plan view of the tool bit holder of FIG. 1.

Referring to the Figs., there is shown the tool bit holder 10. Holder 10 includes, in general terms, cover 11, body 12 and spring belt clip 13. Tool hook or tote 60 is attached to body 12, as will be further discussed hereinafter. Cover 11 is formed of a circular outer surface or face 14, a circular inner surface or face 21, and a cylindrical side 15 integral with face 14. A plurality of radially spaced outwardly protruding ridges 16 are formed on the periphery of face edge 17 to form finger grasp grooves or recesses 17*a*. Cylindrical side 15 is radially inwardly disposed from edge 27 so as to form face inner lip 18. Side 15 is formed with three or equally spaced L-shaped grooves 19 in turn forming three flexible tabs 50 (FIG. 2), having three integral partially spherical detents or buttons 20 formed on each respective tab 50, for reasons hereinafter appearing.

Figure 8:
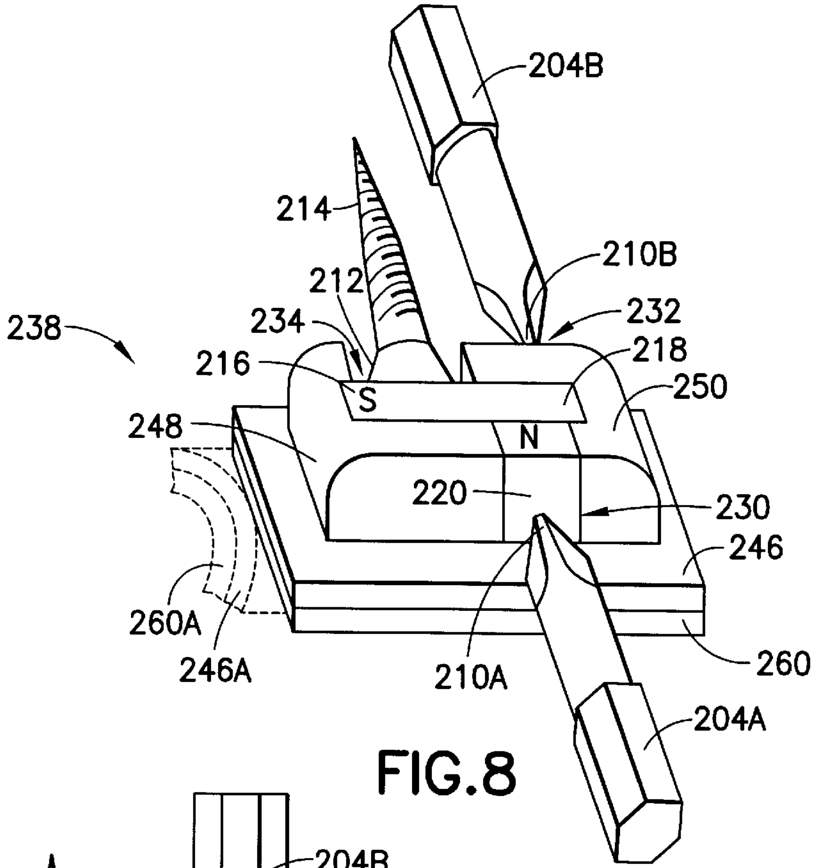
FIG. 8 is a perspective view of the magnetizer/demagnetizer unit.
Figure 9:
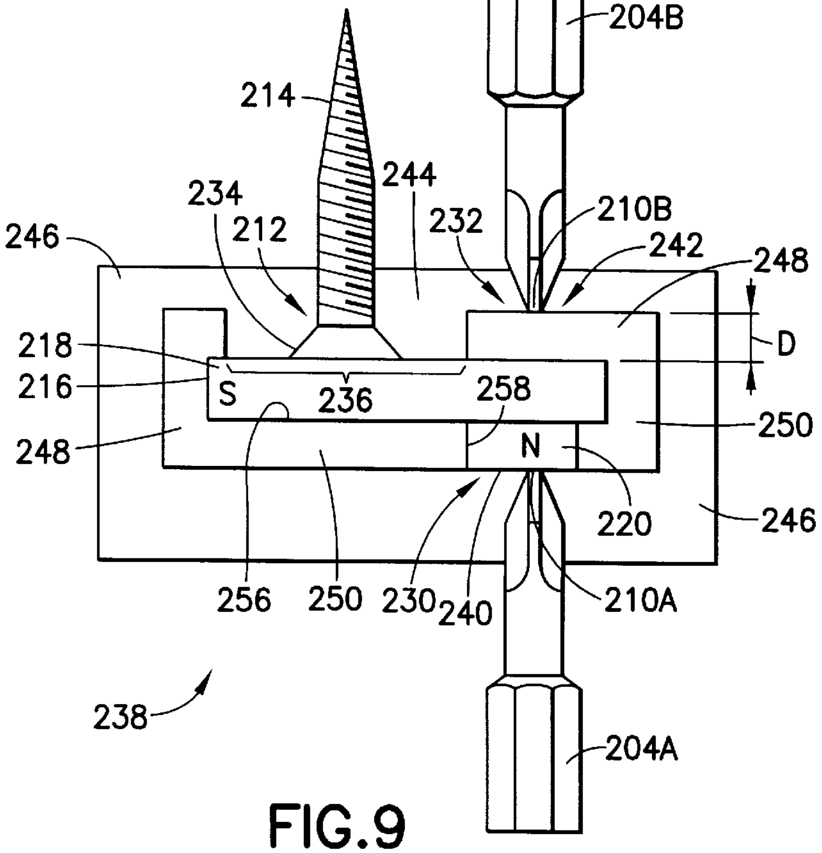
FIG. 9 is an enlarged top plain view of the magnetizer/demagnetizer unit of FIG. 8.

As best shown in FIGS. 8 and 9 there is shown magnetization/demagnetization unit 238 which in general terms houses a permanent high energy elongated magnet 216 which includes an elongated shunt portion 218 and a small high energy super magnet or pill magnet 220A. Super magnet 220A is shown with a north pole N and a south pole S with south pole S in proximity to one end of demagnetized shunt 218A. Demagnetized shunt 218A is elongated and further shown as rectangular in configuration having opposed planar surfaces.

Elongated magnet 216 is of sufficient length, or of longitudinal dimension, that placement of tool bit 204A is permitted on elongated magnet 216 at a first position 230 associated with the north pole N at super magnet portion 220 to magnetize tool bit 204A in particular tool bit tip 210. Elongated magnet 216 permits placement of tool bit 204A in particular tool bit tip 204A at a second position associated with proximal end 228 of shunt portion 218 for demagnetization as shown as tool bit 204B and tool bit tip 204B. Proximal end 228 in fact has a south pole characteristic that acts to demagnetize the north pole magnetic aspect of tool bit 204B. Second position 232 is positioned at a predetermined distance $D_1$ from elongated magnet 216 in particular from proximal end 228 of shunt portion 218 as will be discussed in detail.

As shown in FIGS. 8 and 9, elongated magnet 216 permits placement of a fastening device, in particular, Phillips screw 214, at a third position 234 on elongated magnet 216 associated with south pole S of elongated magnet 216, in particular, distal end 226 of shunt portion 218. Third position 234 is spaced from first and second positions 230 and 232 and defines a screw holding area 236 on the planar surface of elongated magnet 216 that can accommodate screw head in direct contact thereto and so magnetize at least screw head 212 and thus hold screw 214 on the surface of elongated magnet 216.

FIGS. 8 and 9 show magnetizer/demagnetizer mounting unit 238 as also including holding body or mounting have 246 that mounts elongated magnet 216. Holding body 246 is made of a non-magnetizable material such as plastic. Holding body 246 provides a first access 240 associated with first position 230. Holding body 238 further provides a second access 242 associated with second position 232 for demagnification of tool bit 204A in particular tool bit tip 210A and indicated as demagnetized tool bit 204B and tool bit tip 210B in a manner that will be further set forth. Holding body 246 also provides a third access, or access aperture, 244 associated with third position 234 for placement of a fastening device, in particular, screw 214 at third position 234 on elongated magnet 216 associated with south pole S, in particular on shunt portion 218 at distal end 226 so that screw 214 is held by magnetic force to elongated magnet 216 and to magnetizer/demagnetizer 192 and thus to power driving tool 194 while a user carries power driving tool 194 to a desired work area.

After tool bit 204A, particularly tool bit tip 210A has been magnetized at a north pole N, and when the user removes screw 214 from elongated magnet 216 and sets screw 214 in the workpiece and then sets the magnetized tool bit 204A particularly magnetized tool bit tip 210A into the crossed slots of magnetized Phillips screw 214, magnetized screw 214 is held to magnetized tool bit 204A by the magnetic force. After driving screw 214 into the workpiece, there would ordinarily be no necessity to demagnetize magnetized screw 214. Demagnetization of tool bit 204A is however accomplished at second position 232.

Holding body 246 or mounting base 246 has a pair of opposed parallel connected end walls 248 and 250 and a pair of opposed parallel elongated side walls 252 and 254 connected to end walls 248 and 250 to form a generally rectangular structure having a longitudinal dimension defined by parallel side walls 252 and 254. Rectangular mounting base 246 extends beyond both end walls 248 and 250 and both side walls 252 and 254 to form a flat planar flexible attachment base. Mounting base 246, end walls 248 and 250, and side walls 252 and 254 define an elongated rectangular recess 256 in which is positioned shunt portion 218 of elongated magnet 216. Side wall 254 forms a subrecess 258 in which is position super magnet portion 220 so that super magnet portion 220 has an exposed planar surface at first access 240 that defines first position 230.

Tool bit 204A, as shown in FIGS. 8 and 9, is positioned in magnetizing contact with elongated magnet 216 at first position 230 in particular at first access 240 so that bit tip 210 is magnetized. Screw 214 is magnetized by direct contact of screw head 212 with elongated magnet 216 at third position 234. Side wall 254 further forms third access, or access aperture, 244 to elongated magnet 216 at third position 234 where screw head 212 is placed into direct magnetizing contact with and magnetically held by elongated magnet 216.

Side wall 252 has the thickness of the predetermined distance $D_1$ at second position 232, so that tool bit 204A particularly bit tip 210A are demagnetized at second position 232 by placing tool bit tip 210 to side wall 252. Thus, side wall 252 provides second access 242 to elongated magnet 216 at second position 232.

Figure 1:
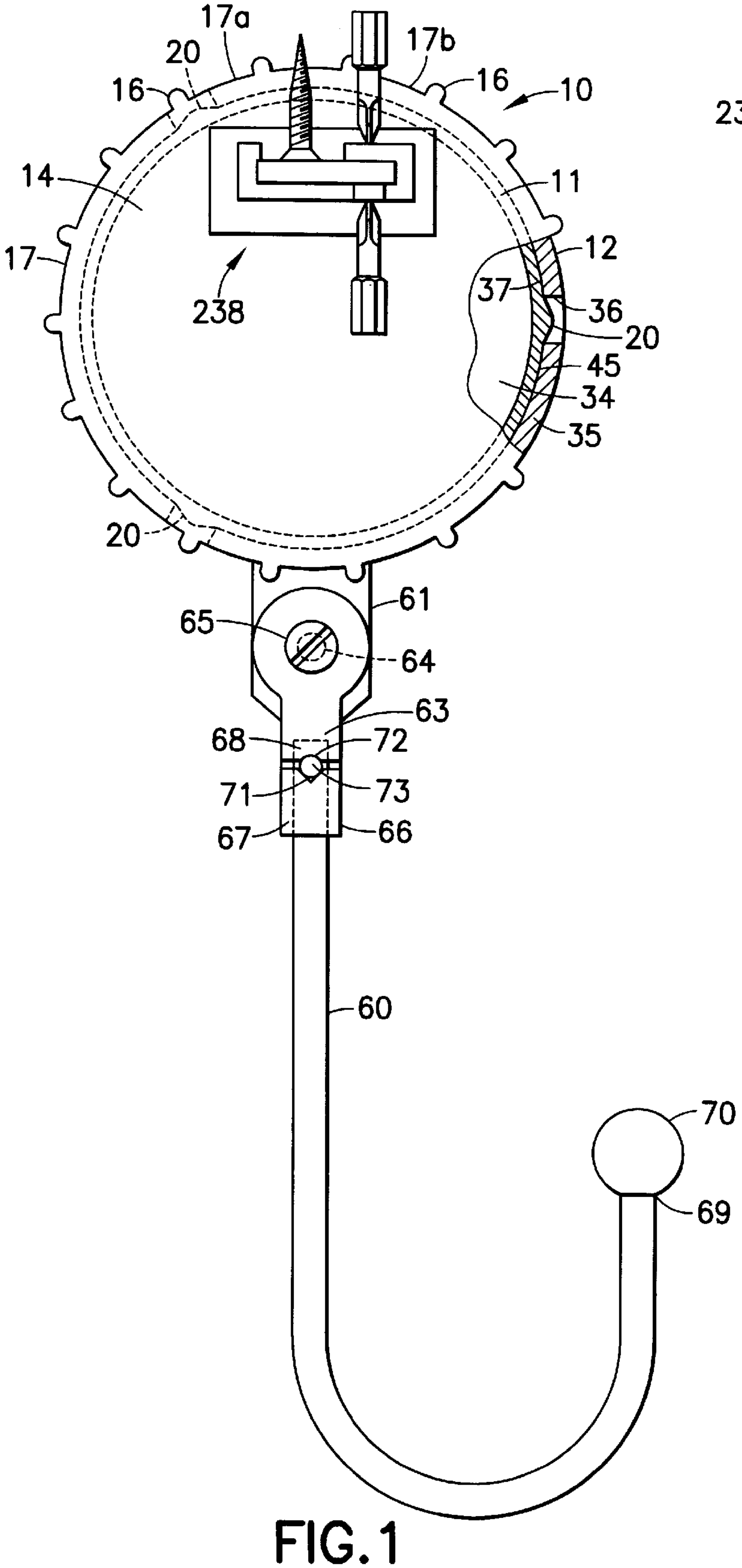
FIG. 1 is a front plan partial fragmentary view of the tool bit holder and magnetizer/demagnetizer and hand tool hook attachment flange of the present invention.
Figure 7:
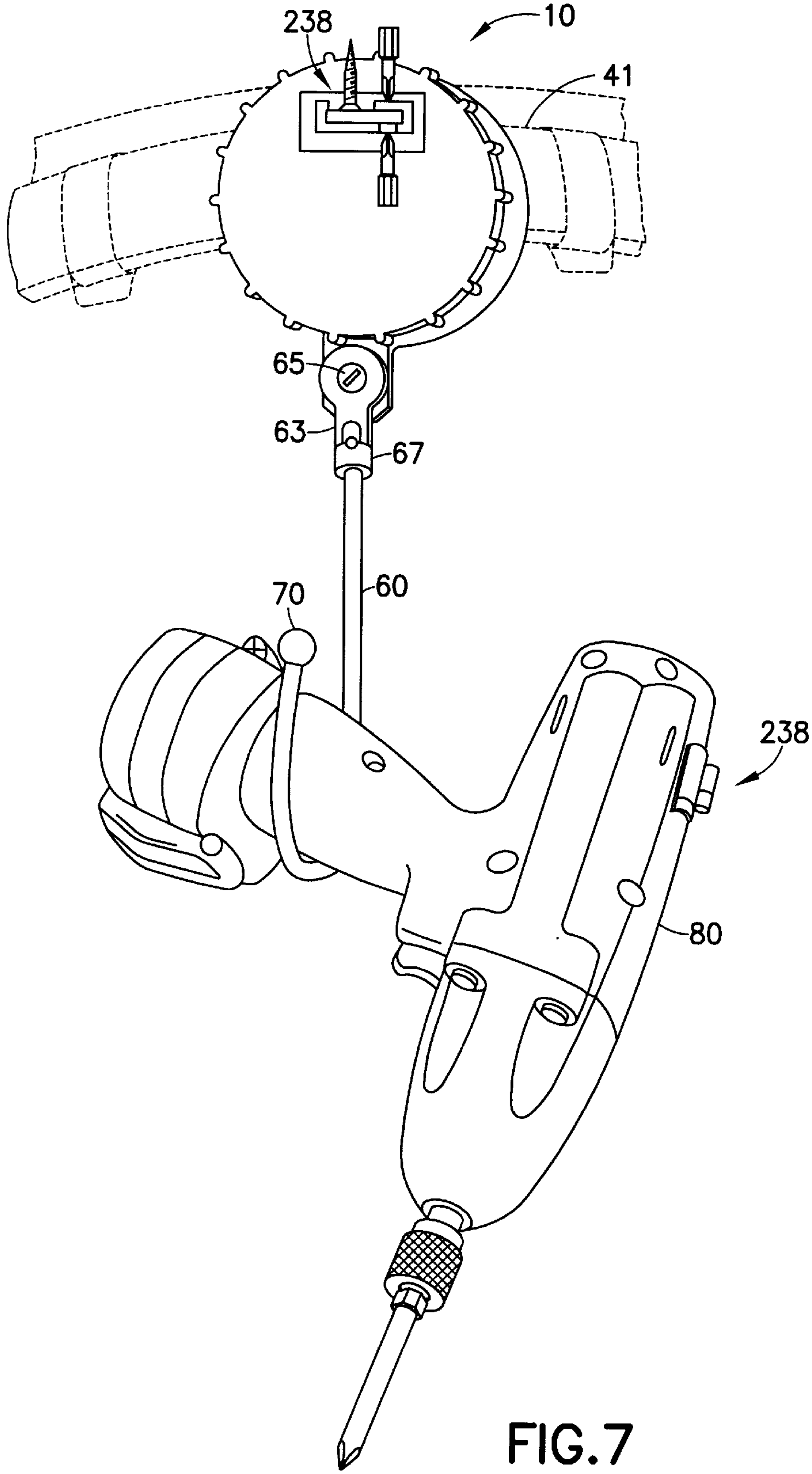
FIG. 7 is a perspective view of the tool bit holder with power hand tool attached to the belt of the user with magnetizer/demagnetizer units on the tool bit holder and power hand tool.

An adhesive bottom side 260 of planar mounting base, can attach magnetizer/demagnetizer 192 to any surface, preferably a planar surface of a non-operational portion of a power driving tool (FIG. 7) or on the tool holder cover (FIGS. 1 and 7). An alternative mounting base 246A is by nature of the flexible planar base portion, contoured to fit onto an arcuate non-operative portion of the housing 196 of a power driving tool such as power driving tool 194. Elongated concave arcuate mounting base 246A has the base of the concavity extending longitudinally midway between side walls 252 and 254 so that magnetizer/demagnetizer 192 fits in longitudinal direction on a curved surface of a power tool housing. Contoured adhesive bottom side 260A shown in phantom line (FIG. 8) is connected to contoured mounting base 246A for connecting holding body 238 to a non-operative curved portion of the housing of a power driving tool. The planar mounting base 246 can be made of a flexible material such as plastic that can be contoured to fit onto a housing such as power tool housing 196 in a manner analogous to contoured mounting base 246A. Adhesive bottom side 260 can likewise be made of a flexible material that can be contoured along with a flexible mounting base 246. Flexible mounting base 246 can be flexibly adjusted to fit the desired location on a power tool housing.

It is within the contemplation of the present invention for the magnetizer/demagnetizer to be an elongated high energy permanent bar magnet as shown and described in Ser. No. 09/489,484, filed Jan. 21, 2000. The magnetizer/demagnetizer construction as shown and described in application Ser. No. 09/489,484, filed Jan. 21, 2000, is incorporated herein by reference thereto.

Figure 4:
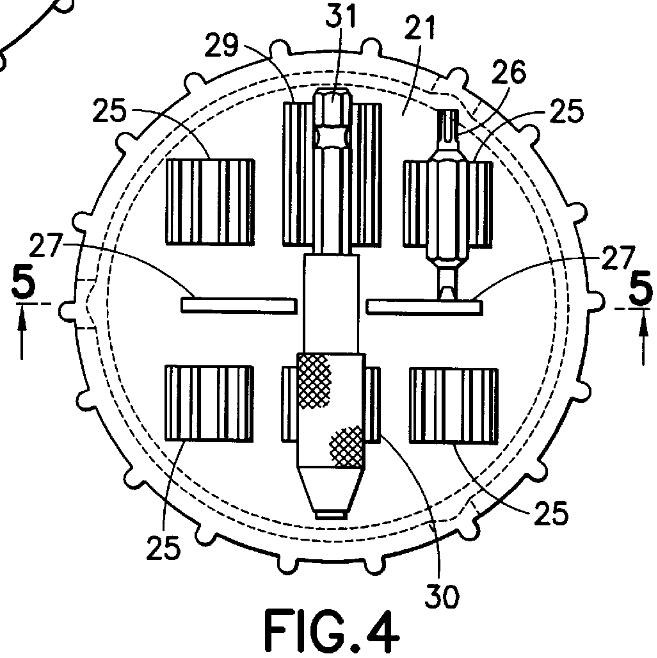
FIG. 4 a plain view of the tool bit holder of FIG. 1 showing the inside of the cover.
Figure 5:
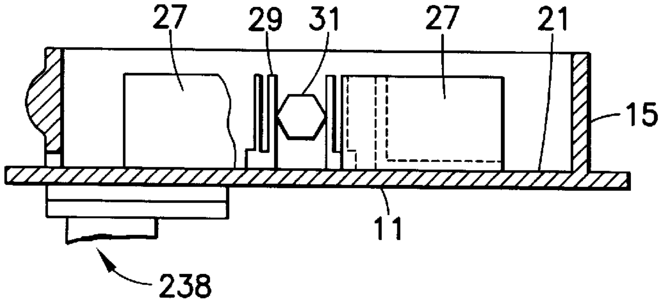
FIG. 5 is a sectional view taken along line 5—5 of FIG. 4.
Figure 6:
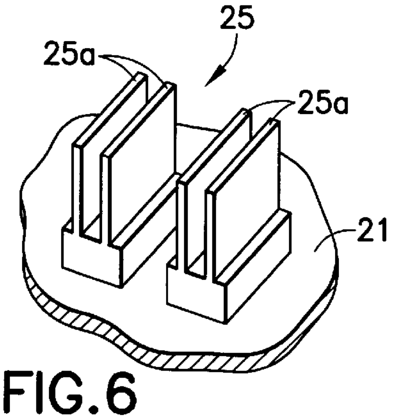
FIG. 6 is an enlarged fragmentary perspective view of one of the inside cover tool bit holders.

Referring now specifically to FIGS. 4–6, there is shown the inner circular surface 21 of cover 11, and a first plurality of four sets of like spaced clips 25 integrally formed or molded on and with surface 21 for holding tool bits 26 (typical) or like tool elements. A set of two stops elements 27 are also integrally formed or molded with surface 21. In this manner of construction, tool bit 26 is releasably clipped between clips 25 and held in place by stop 27 as at 28. A set of clips 29 are centrally disposed with clips 30 also centrally disposed on surface 21 to provide for releasable mounting of tool chuck 31, as best shown in FIG. 6. Clips 25 are provided with double clip elements 27*a* (FIG. 7) to permit additional clip mountings for other tool elements (not shown).

Body 12 is formed of circular back 34, and cylindrical peripheral side 35 having three equally radially spaced holes 36. Side 36 has inner cylindrical surface 37. Cover cylindrical surface 37 with buttons 20 slidably interengages body cylindrical surface 37. Holes 36 are equally radially disposed and fixed to slidably releasably receive buttons 20.

Belt clip 13 is formed of heavy-duty plastic construction and is shaped to provide a spring like gripping or holding action to a tool belt (FIG. 7). Clip 13 is permanently affixed to body back 34 by means of two screws 38 or like fastening elements.

In the aforesaid manner of construction, the user attaches or clips holder 10 to a tool belt or like belt 41 by means of clip 13, and uses one hand to finger grab between ridges 16 in grooves 17*a* to rotate cover 11 to, in turn, cause the buttons 20 to slidably disengage from holes 36 by and with the flexure of tabs 50, which tab flexure is achieved by means of L-shaped groves 19. It is important to note that the user need only rotate the cover substantially less than 120° to disengage and remove cover 11 from body 12. The user then inverts the cover to view the array of tool bits for removal, and replaces the undesired tool bit and/or removes the desired selected tool bit from and by means of clips 25. The user then finger engages the ridges 16 and grooves 17*a* and rotatably replaces cover 11 on body 12. The user need rotate the cover 11 no more than 120° to cause buttons 20 to contactingly slide on cylindrical side surface 37 to flex tabs 50 to cause sliding engagement of the buttons 20 into holes 36 to lock the cover onto the body, and thereby lock and encase the tool bits in the holder. The user then magnetizes the selected tool bit in the afore-described manner and operably attaches the tool bit to the drill. The user then removes the screw from the magnetic attachment position, and magnetically holds the screw to the operably disposed tool bit.

Body 12 is integrally formed with depending flange 61, having a through hole 62 for attachment of the drill holding hook. An L-shaped swivel connection piece 63 is formed with coincident through hole 64. A bolt 65 is sized to be slidably rotatably mounted in coincident holes 62 and 64 so that connection piece 63, and, in turn, tubular hook 60, are swivel mounted to holder 10. Connection 63 is formed at its lower end 66 with a cylindrical portion 67 for slidably receiving the proximate end 68 of tubular hook 60. The distal end 64 of hook 60 is formed with the threads (not shown) for receiving end ball or stop 70 having corresponding threads (not shown). Cylindrical portion 67 is formed with a plurality of semi-circular grooves 71. The proximate end of tubular hook 70 is formed with a plurality of radially disposed holes 72 which may be threaded if desired. Pins 73 are sized to engage holes 72 and rest in grooves 71. In this manner, cylindrical portion 67 and in turn hook 60 may be rotatably angularly disposed and pinned in place by pins 73, thereby rotating hook 60 away from the user's body to a desired angle. The weight of the drill on the hook 60 holds the pin 73 into the selected groove.

A variety of tools can be hung from the hook 60. When a tool, e.g., drill 80, is held on hook 60, the hook 60 automatically adjusts for the tool center of gravity by means of the rotational movement of swivel connection piece 63 (FIG. 7). In this manner, drill 60 is not only prevented from falling off the hook, but also is readily accessible to the tool bit holder user.

Tool totes and tool hooks are well known in the art and may be mounted to the tool holder hook attachment feature by other means well known in the art. The hook connection piece and end-ball may be formed of metal construction, and the hook itself may be formed of drawn tubular metal construction buy methods well known in the art. The cover, body, hook attachment flange, spring belt clip and magnetizer/demagnetizer housing may be formed of molded plastic construction by molding means well known in the art.

While the invention has been described in terms of its use in connection with a drill, tool bits and a tool chuck, it is to be understood that the tool holder may be provided with diverse means for holding other tool elements, and it is not the intention of the invention to limit the same to holding tools bits.

It is also within the contemplation of the present invention for the magnetizer/demagnetizer unit or housing to be a molded portion of the outside or inside portions of the tool bit holder cover.

While particular embodiments of the invention have been described, it will be understood and obvious to one skilled in the art that the invention is not so limited, so that obvious modifications and variations can be made, and that such modification and variations are intended to fall within the scope of the appended claims.

What is claimed is:

1. A tool bit holder comprising, body means and cover means for removably enclosing said body means, clip means for holding the body means to the belt of the user, said clip means being disposed on the body means, said cover means comprising means for holding a plurality of tool bits, said cover means further comprising permanent magnet means for magnetizing and demagnetizing said tool bits.

2. The tool bit holder of claim 1, said permanent magnet means further comprising means for magnetically attaching a fastener element.

3. The tool bit holder of claim 1, said body means further comprising means for attaching a tool hook.

4. The tool bit holder of claim 1, said permanent magnet means comprising an elongated magnet having opposed first and second poles arranged on a non-operative portion of the cover means to permit placement of one of said tool bits on said elongated magnet at a first position associated with said first pole to magnetize the tool bit and also to permit placement of the tool bit at a second position associated with said second pole to demagnetize the tool bit, said second position being at a predetermined distance from said magnet, said elongated magnet defining a holding area to permit magnetic holding of at least one fastening element at a third position on said elongated magnet associated with said second pole, and mounting means for holding said elongated magnet and for providing first and third accesses at said first and third positions, respectively, to said elongated magnet and for providing a predetermined distance at said second position.

5. The tool bit holder of claim 4, wherein said elongated magnet comprises a high energy magnet portion and an elongated ferromagnetic shunt portion, said high energy magnet portion being magnetically held to said shunt portion.

6. The tool bit holder of claim 4, said permanent magnet means comprising means for attaching said mounting means to said cover means.

7. The tool bit holder of claim 6, said elongated magnet comprises a high energy magnet and an elongated ferrometallic shunt, said high energy magnet being magnetically held to the shunt.

8. The tool bit holder of claim 7, said high energy magnet being disposed adjacent one end of the elongated shunt.

9. The tool bit holder of claim 4, said mounting means comprising a plastic base.

10. The tool bit holder of claim 9, further comprising adhesive means for attaching said mounting means to said cover means, said adhesive means comprising an adhesive disposed on said plastic base.

11. A tool bit holder comprising body means and cover means for removably enclosing the body means, said cover means comprising means for removably holding a plurality of tool bits, said body means comprising clip means for attaching the body means to the belt of a user, said body means further comprising means for attaching a hook for holding a hand tool, wherein with the body means enclosed by the cover means, the tool bits are removably held on the cover means within the enclosed body means, whereby the user with the holder clipped to his belt removes the cover means from the body means to access the tool bits, selects a tool bit, removes the hand tool from the hook and assembles the selected tool bit to the hand tool.

12. The tool bit holder of claim 11, said cover means and said body means comprising respective cylindrical configuration means for rotatably slidably interengaging the cover means with the body means.

13. The tool bit holder of claim 11, further comprising a permanent magnet, said permanent magnet being elongated and having opposed first and second poles arranged on a non-operative portion of the cover means to permit placement of one of said tool bits on said elongated magnet at a first position associated with said first pole to magnetize the tool bit and also to permit placement of the tool bit at a second position associated with said second pole to demagnetize the tool bit, said second position being at a predetermined distance from said magnet, said elongated magnet defining a holding area to permit magnetic holding of at least one fastening element at a third position on said elongated magnet associated with said second pole, and mounting means for holding said elongated magnet and for providing first and third accesses at said first and third positions, respectively, to said elongated magnet and for providing a predetermined distance at said second position, whereby the selected tool bit is magnetized before assembly to the hand tool.

14. The tool bit holder of claim 13, wherein said elongated magnet comprises a high energy magnet portion and an elongated ferromagnetic shunt portion, said high energy magnet portion being magnetically held to said shunt portion.

15. The tool bit holder of claim 14, said high energy magnet being disposed adjacent one end of the elongated shunt.

16. The tool bit holder of claim 13, said mounting means comprising a plastic base.

17. The bit holder of claim 16, and further comprising adhesive means for attaching said mounting means to said cover means, said adhesive means comprising an adhesive disposed on said plastic base.

18. The tool bit holder of claim 13, said cover means being integrally formed with said mounting means.

19. The tool bit holder of claim 18, said mounting means and said cover means comprising molded plastic construction.

20. The tool bit holder of claim 13, said cover means and said body means being cooperatively integrally formed to provide said mounting means.

21. The tool bit holder of claim 20, said cover means and said body means comprising respective apertures for insertion of a selected tool bit into the holder for contact with the permanent magnet for magnetizer.

22. The tool bit holder of claim 13, said cover means being formed with a portion for demagnetization of the selected tool bit.

23. The tool bit holder of claim 21, said cover means being formed with a second aperture for access to said permanent magnet for magnetically attaching a fastening element.

24. The tool bit holder of claim 11, said cover means and said means for attaching said hook being of integral one-piece plastic construction.

25. The tool bit holder of claim 11, said means for attaching said hook comprising a flange formed with and extending away from said body means.

* * * * *